US007643857B2

(12) United States Patent
Yang et al.

(10) Patent No.: US 7,643,857 B2
(45) Date of Patent: Jan. 5, 2010

(54) FOLDABLE ELECTRONIC DEVICE

(75) Inventors: Gang Yang, Shenzhen (CN); Rui-Hao Chen, Shenzhen (CN); Ye Liu, Shenzhen (CN); Chia-Hua Chen, Tu-Cheng (TW); Hsiao-Hua Tu, Tu-cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 598 days.

(21) Appl. No.: 11/396,976

(22) Filed: Apr. 3, 2006

(65) Prior Publication Data

US 2007/0064381 A1    Mar. 22, 2007

(30) Foreign Application Priority Data

Sep. 16, 2005    (CN) .................. 2005 1 0037364

(51) Int. Cl.
*H04M 1/00* (2006.01)

(52) U.S. Cl. .............. 455/575.4; 455/550.1; 455/575.1; 455/575.2; 455/575.3

(58) Field of Classification Search .............. 455/575.3, 455/575.4, 575.5, 550.1, 575.1, 575.2, 575.8
See application file for complete search history.

(56) References Cited

U.S. PATENT DOCUMENTS

| 6,324,386 | B1 * | 11/2001 | Headon ............... 455/575.3 |
| 7,006,853 | B2 * | 2/2006 | Kang et al. ........... 455/575.3 |
| 7,395,100 | B2 * | 7/2008 | Cha et al. ............ 455/575.1 |
| 2001/0019946 | A1 * | 9/2001 | Okuda ................. 455/90 |
| 2002/0107055 | A1 * | 8/2002 | Yamazaki et al. ..... 455/575 |
| 2003/0144034 | A1 * | 7/2003 | Hack et al. .......... 455/566 |
| 2004/0058715 | A1 * | 3/2004 | Taniguchi et al. ..... 455/566 |

FOREIGN PATENT DOCUMENTS

CN        2685783        12/2004

* cited by examiner

*Primary Examiner*—Nick Corsaro
*Assistant Examiner*—Amanuel Lebassi
(74) *Attorney, Agent, or Firm*—Steven M. Reiss

(57) ABSTRACT

A foldable electronic device (100) has at least two components hinged together by a hinge assembly. The foldable electronic device includes: a cover (10), a rotating element (20), an elastic element (30) and a frame (40), a set of magnetic elements (50) and a body (60). The rotating element has two notches defined therein. The elastic element has a latching portion. The elastic element is fixed in the rotating element. The frame slidably engages with the rotating element. The frame is engaged with the cover. The rotating element rotatably connects with the body. The magnetic elements make the cover close relative to the body. When the latching portion of the rotating element engages in different notches of the rotating element, magnetic force between the magnetic elements decreases so as to open the cover relative to the body.

18 Claims, 9 Drawing Sheets

FOLDABLE ELECTRONIC DEVICE

BACKGROUND OF THE INVENTION

1. Field of the Invention

The present invention relates to foldable electronic devices and, particularly, to a foldable electronic device with a conveniently openable cover.

2. Discussion of the Related Art

With the development of wireless communication and information processing technologies, foldable electronic devices such as mobile phones and PDAs (Personal Digital Assistants) are appearing in abundance, and consumers may enjoy the full convenience of high technology anytime and anywhere. Foldable electronic devices are liked by a wide range of consumers because of their small size, novel design and ease of storage. Use of a foldable design can also avoid accidental activation of keys/buttons of the electronic device during transportation/storage.

One kind of typical foldable electronic devices opens automatically through a button activated release. Foldable electronic devices usually consist of a hinge assembly that connects a body with a flip cover. The hinge assembly includes a control member, a cam, a shaft and an elastic member. The control member is connected to a button. When the button is pushed, the control member is released. The cam then rotates relative to the shaft of the hinge assembly under the elastic force of the elastic member. In doing so the cam causes the flip cover of the foldable electronic device to rotate with it. Thus, the foldable electronic device opens automatically. However, the button of this kind of foldable electronic device can easily be activated accidentally whilst being carried in a bag or in a pocket, and accidental activation of the electronic device itself can result from this.

Therefore, a new foldable electronic device is desired in order to overcome the above-described problems.

SUMMARY OF THE INVENTION

One embodiment of the present sliding structure includes a rotating element, an elastic element and a frame. The rotating element is configured for rotatably attaching to a main body of an electronic device. The rotating element has two notches defined therein. The elastic element has a latching portion. The elastic element is fixed in the rotating element. The frame slidably engages with the rotating element. The latching portion of the rotating element selectably engages in one of the notches of the rotating element so as to limit the frame in different positions of the frame relative to the rotating element.

One embodiment of the present cover assembly includes a cover and a sliding structure. The sliding structure includes a rotating element, a frame and a control mechanism. The rotating element is configured for rotatably attaching to a main body of an electronic device. The frame slidably engages with the rotating element and is rotatable with the rotating element. The frame is engaged with the cover so that the cover is slidable relative to and rotatable with the rotating element. The control mechanism is configured for releasably locking the frame in a predetermined position relative to the rotating element.

One embodiment of the present foldable electronic device includes: a main body, a cover assembly rotatable between a closed state and an open state and a locking mechanism. The cover assembly includes a rotating element and a cover. The rotating element rotatably connects with the main body. The cover is attached to the rotating element in a manner so as to be slidable relative to and rotatable with the rotating element. The locking mechanism forms between the main body and the cover assembly. The cover is slidable between a locked position where the locking mechanism locks the cover assembly in said closed state and an unlocked position where the locking mechanism releases the cover assembly so as to allow the cover assembly to rotate to said open state.

Other advantages and novel features of the present foldable electronic device will become more apparent from the following detailed description when taken in conjunction with the accompanying drawings.

BRIEF DESCRIPTION OF THE DRAWINGS

Many aspects of the foldable electronic device can be better understood with reference to the following drawings. The components in the drawings are not necessarily to scale, the emphasis instead being placed upon clearly illustrating the principles of the present foldable electronic device. Moreover, in the drawings, like reference numerals designate corresponding parts throughout the several views.

DETAILED DESCRIPTION OF THE EMBODIMENTS

Figure 1:
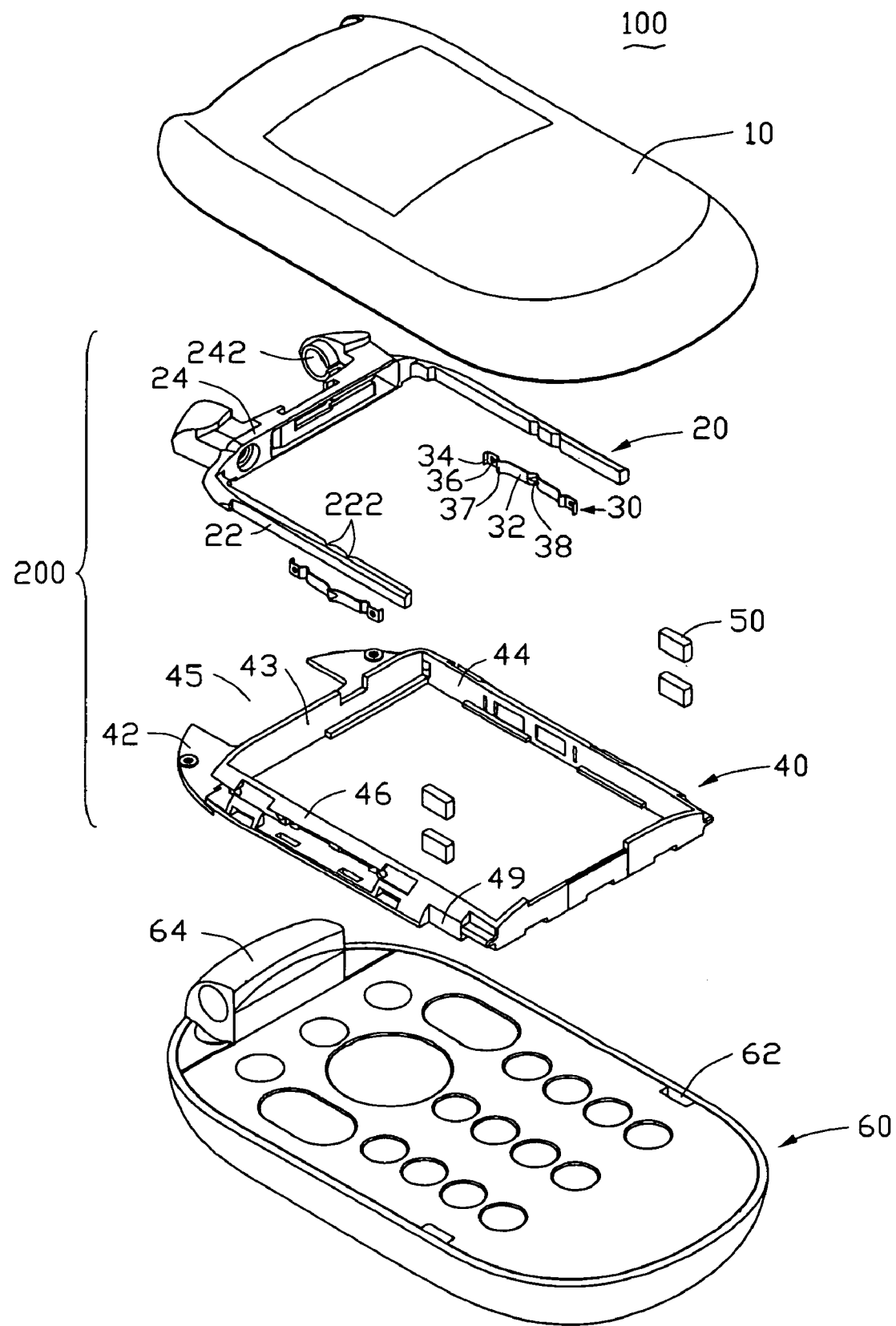
FIG. 1 is an exploded, isometric view of an embodiment of the present foldable electronic device.

Referring now to the drawings in detail, FIG. 1 shows a sliding structure 200, applied to a foldable electronic device such as a flip type mobile phone 100. The sliding structure 200 cooperates with an automatic hinge assembly (not shown) to be used together in the flip type mobile phone 100.

The flip type mobile phone 100, in the embodiment illustrated, includes a cover 10, a sliding structure 200, and a body 60. The sliding structure 200 includes a rotating element 20, two elastic members 30, a frame 40, and four magnetic elements 50. The rotating element 20, the elastic members 30 and the frame 40 are assembled in the cover 10. The assembled cover 10 and the body 60 are connected with each other by means of the automatic hinge assembly.

Figure 2:
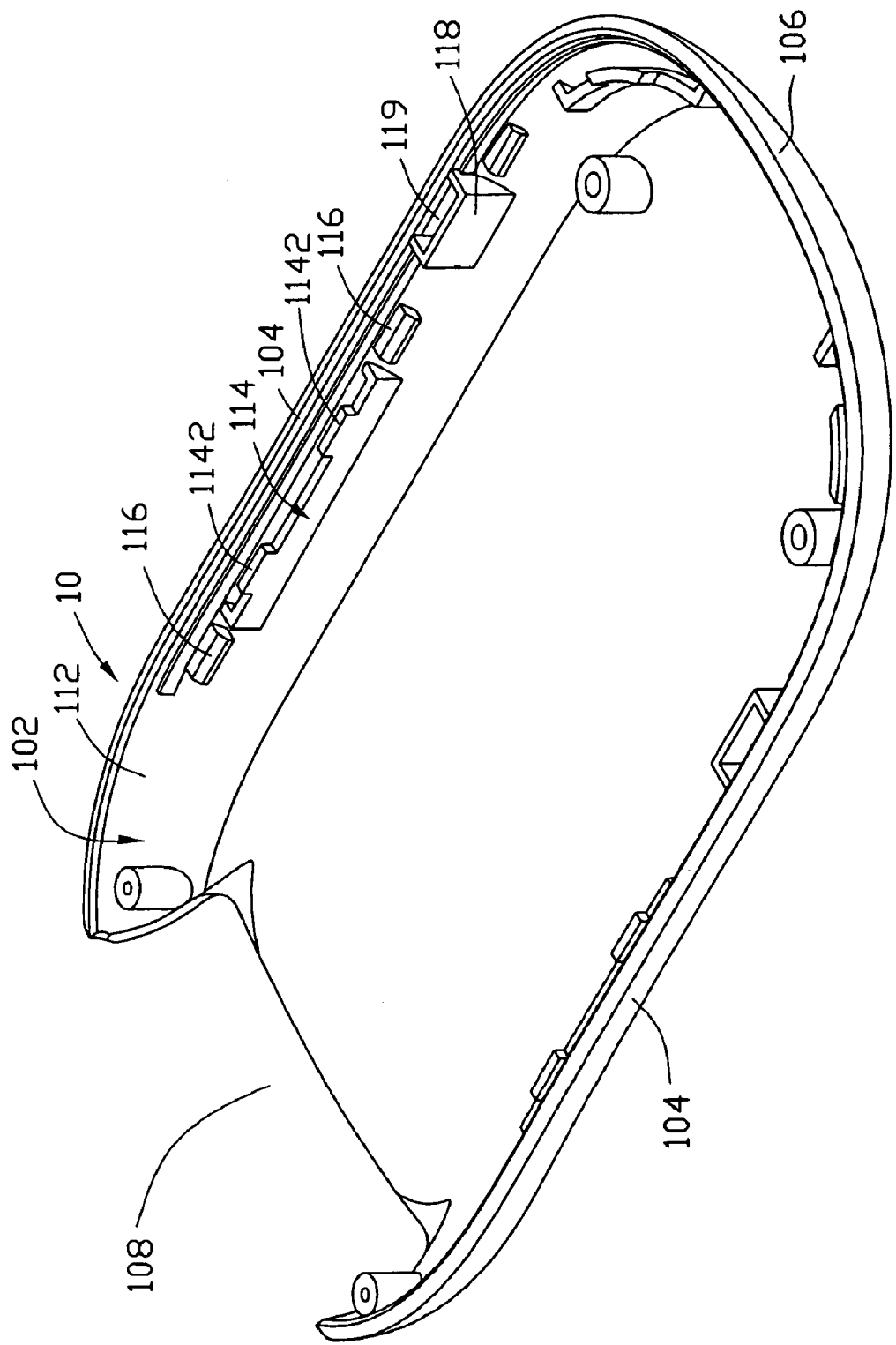
FIG. 2 is an enlarged view of the cover shown in FIG. 1, but viewed from another aspect.

Referring also to FIG. 2, the cover 10 is substantially a board. The cover 10 includes a main wall 102, two sidewalls 104 and one end wall 106. The main wall 102 is substantially rectangular, which together with the sidewalls 104 and the end wall 106 defines a space therebetween. Opposite to the end wall 106, the main wall 102 has a cutout 108 defined at one end thereof. Each sidewall 104 has an inner surface 112. Each inner surface 112 has a block 114 disposed on the inner surface 112 so as to be positioned opposite the block on the opposing surface. Each block 114 has two spaced projections 1142 formed at a free side thereof. Adjacent to each block 114, two protrusions 116 are disposed at two sides thereof. A containing portion 118 is formed in a proximal end of the sidewalls 104 adjacent to one of the protrusions 116. The containing portion 118 has some height relative to the inner surface 112. The containing portion 118 has a containing groove 119 defined therein.

Figure 3:
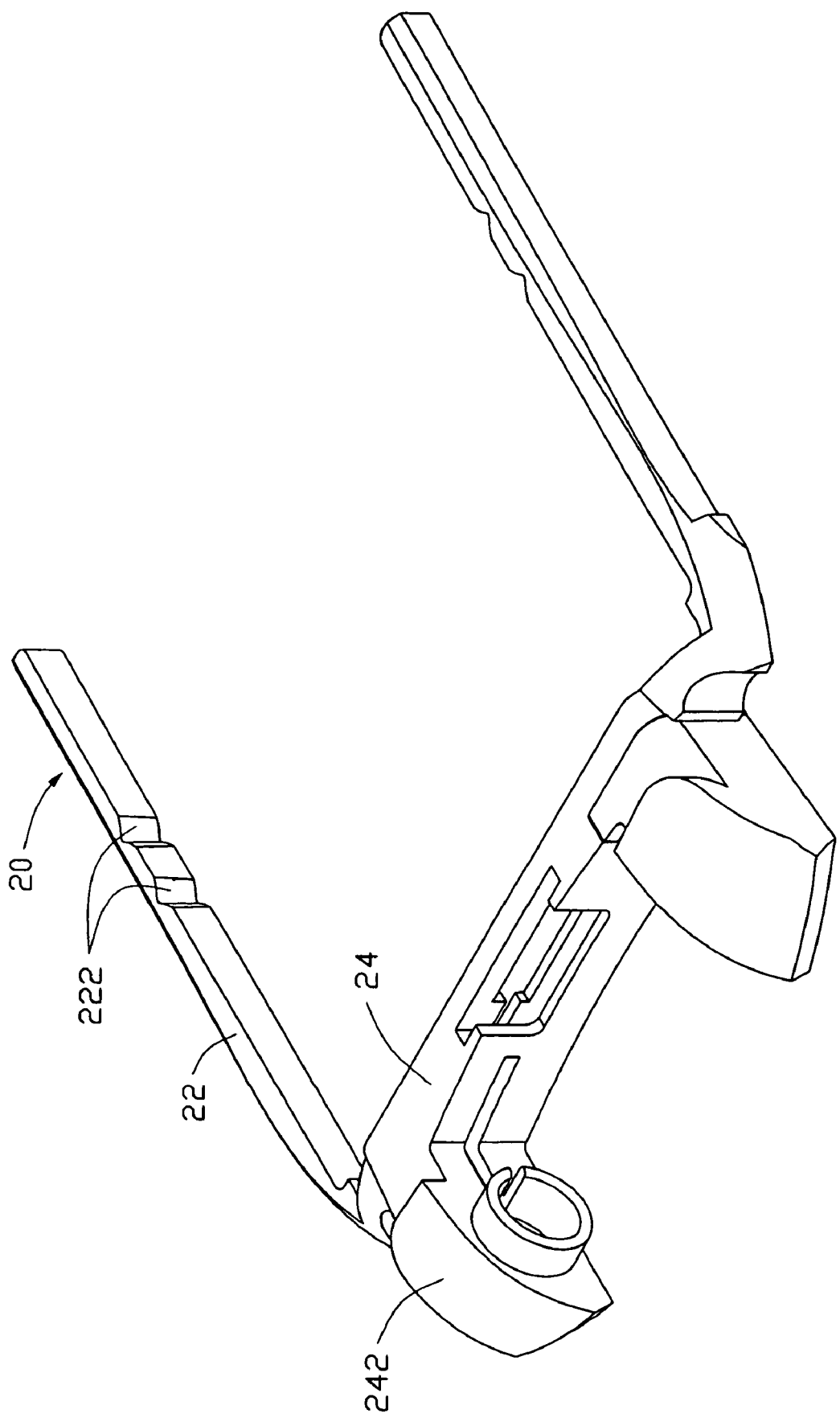
FIG. 3 is an enlarged view of the sliding member shown in FIG. 1.

Referring also to FIG. 3, the rotating element 20 has a substantially U-shaped configuration and includes two rod portions 22 and a connecting portion 24 integrally formed with the rod portions 24. The connecting portion 24 connects with one end of each rod portion 22, each rod portion 22 has two spaced rod notches 222 defined in a center toward an inside direction. The connecting portion 24 has two opposite connecting sleeves 242 disposed at two ends.

Figure 4:
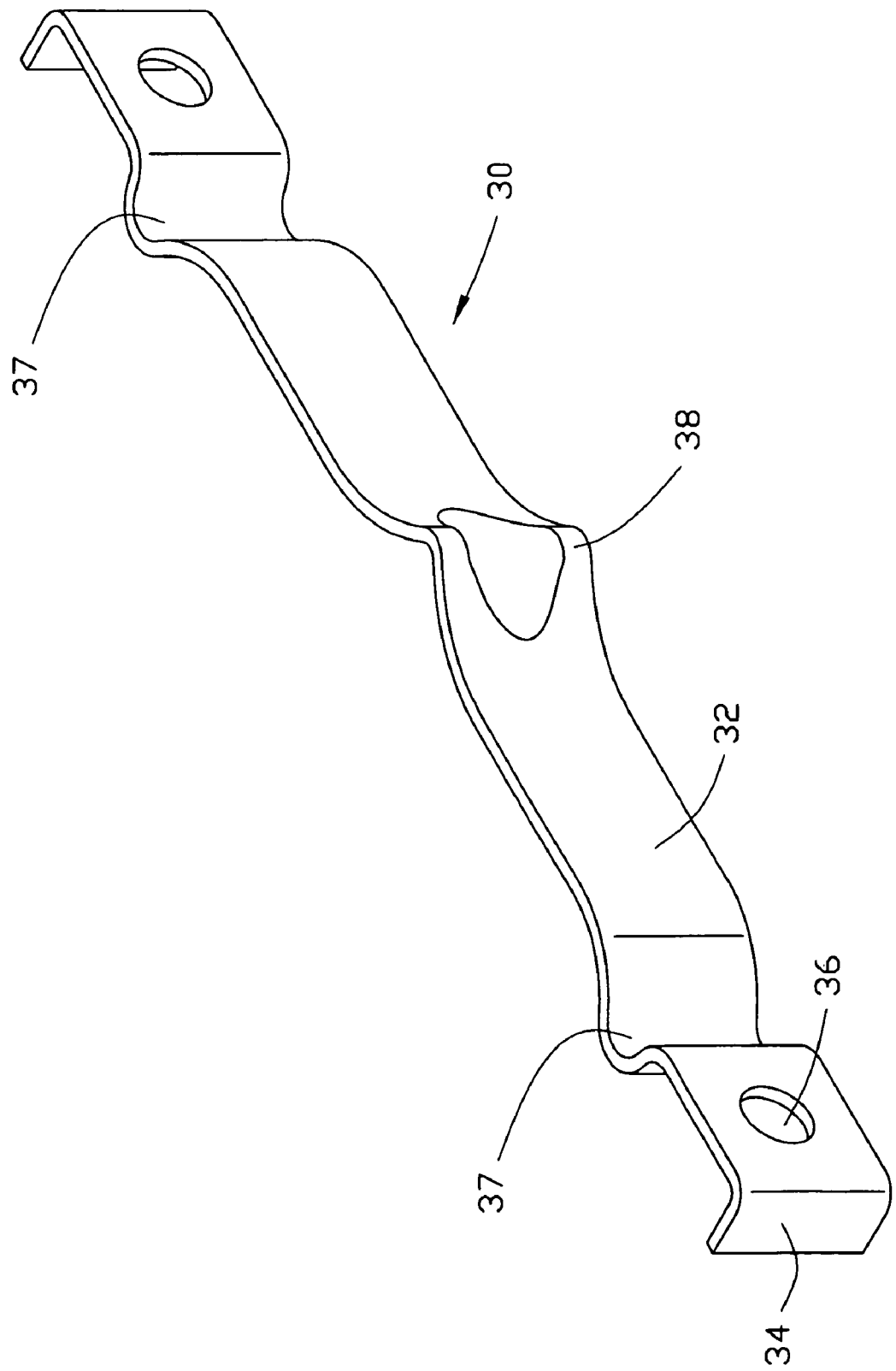
FIG. 4 is an enlarged view of the elastic member shown in FIG. 1.

Referring also to FIG. 4, the elastic element 30 is substantially strip-shaped with a surface bent to form a wave-pattern. The elastic element 30 includes a main section 32 and two extending sections 34. The extending sections 34 are perpendicularly formed at two opposite ends of the main section 32. The main section 32 has a pivotal hole 36 defined adjacent to each of the extending sections 34. The main section 32 includes two concave portions 37 and one convex portion 38 between the pivotal holes 36. The concave portions 37 and the convex portion 38 are formed through bending. The concave portions 37 extend in a direction similar to that of the extending sections 34. The convex portion 38 extends in a direction opposite to that of the concave portions 37.

Figure 5:
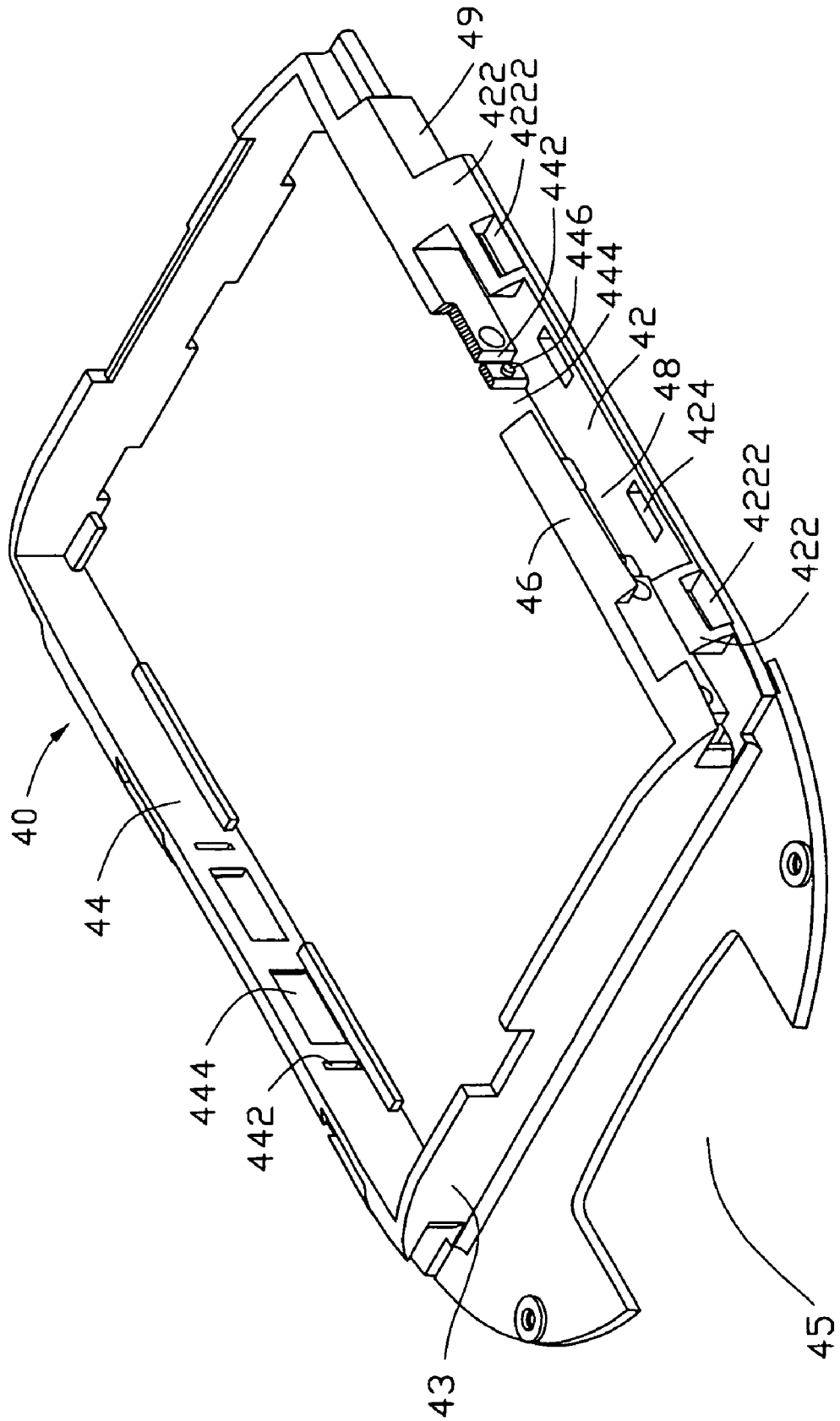
FIG. 5 is an enlarged view of the frame shown in FIG. 1.

Referring also to FIG. 5, the frame 40 includes a main board 42, two connecting boards 43 and two side boards 44 perpendicularly connected with each other. The main board 42 is substantially rectangular in shape. The fame 40 includes a space. The connecting boards 43 and the sideboards 44 respectively perpendicularly extend from an inside of the main board 42, and surround the space together. The main board 42 has a rectangular opening 45 defined at a proximal end thereof. Two extending boards 46 extend from the side boards 44 opposite to the main board 42. The extending boards 46, the side boards 44, and the main board 42 cooperatively form a receiving cavity 48, which receives the rod portions 22 of the rotating element 20. The main board 42 has two stoppers 422 defined at two sides thereof. The stoppers 422 extend some height from the main board 42. Each of the stoppers 422 has a positioning groove 4222 defined in an outside thereof. Two spaced latching slots 424 are defined between the two stoppers 422. The side boards 44 respectively has two spaced slits 442 and two long openings 444. The two slits 442 are located at two sides of the long openings 444. The side boards 44 has two posts 446 disposed at one side thereof opposite to the stoppers 422. The posts 446 are located between the two slits 442, and are adjacent to two sides of the long openings 444. Each of posts 446 engages in the pivotal hole 36 of the elastic element 30. The extending sections 34 of the elastic element 30 are received in the slits 442, and the two concave portions 37 of the elastic element 30 are accommodated in the two long openings 444. Opposite to the rectangular opening 45, the extending boards 46 intersect with the main board 42, forming a step 49.

The magnetic element 50 is substantially rectangular in shape. The two magnetic elements 50 are disposed in the containing grooves 119 of the cover 10. Another two magnetic elements 50 are disposed in the body 60 of the mobile phone 100. When the cover 10 is closed relative to the body 60, the magnetic elements 50 attract each other by magnetic force.

The body 60 is used for accommodating keypads and printed electronic boards. The body 60 has a pair of recesses 62 for receiving two magnetic elements 50. A barrel 64 is disposed at one end of the body 60. A hinge assembly may be put into the barrel 64 of the body 60.

Figure 6:
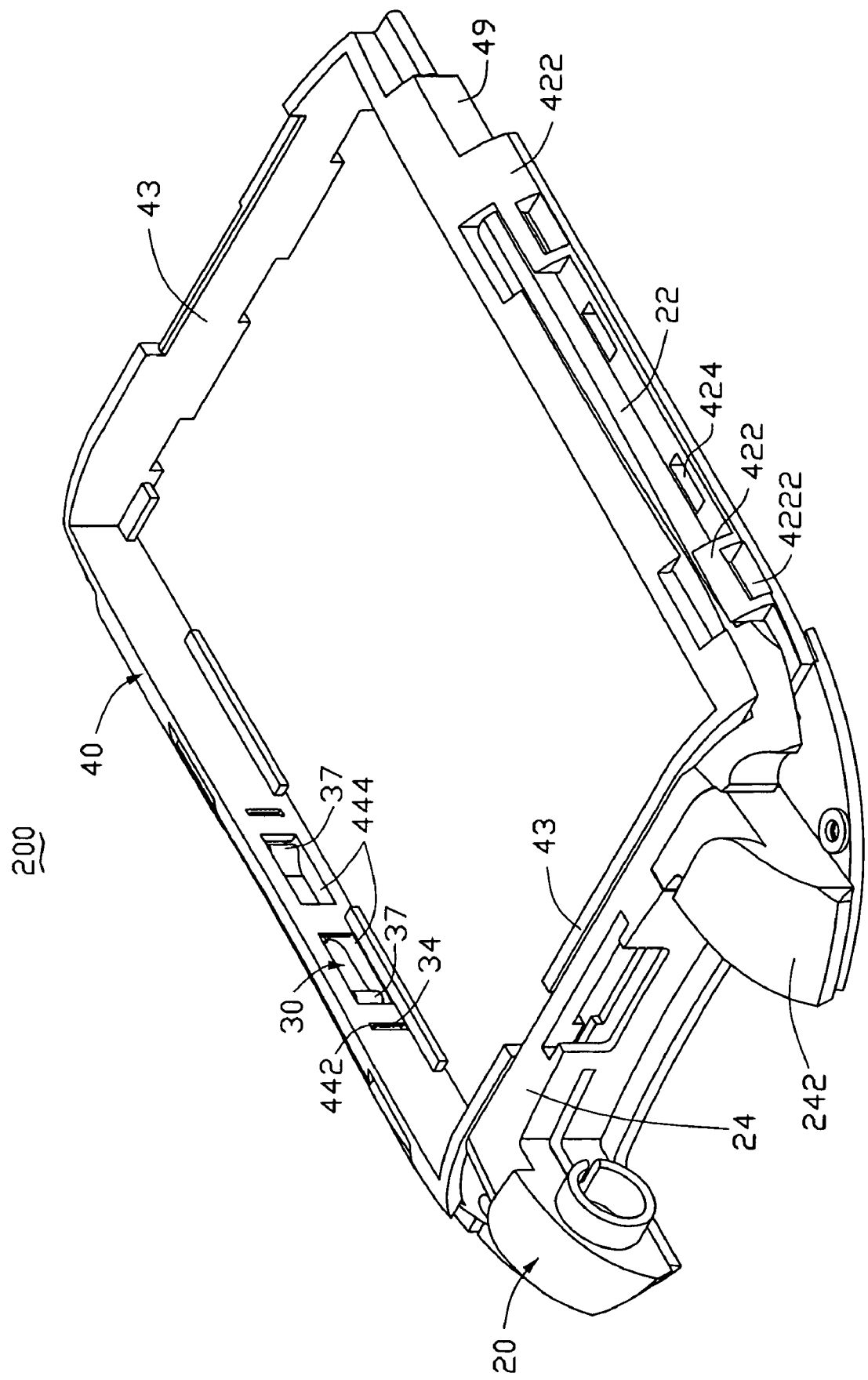
FIG. 6 is an assembled view of the cover assembly without the cover in FIG. 1.

In assembly, referring to FIG. 6, the elastic element 30 is assembled into the frame 40. The extending sections 34 of the elastic element 30 are respectively inserted into the slits 442 of the frame 40. At the same time, the pivotal holes 36 of the elastic element are aligned with the posts 446 of the frame 40, and the posts 446 are inserted into the pivotal holes 36. One concave portion 37 is accommodated in each of the long openings 444 of the frame 40. Accordingly, the elastic element 30 is fixed onto the frame 40. After that, the two rod portions 22 of the rotating element 20 are inserted along one end of the frame 40 so as to be accommodated in the receiving cavity 48 of the frame 40. One side of each rod portion 22 is adjacent to the elastic element 30, the other side of each rod portion 22 resists the stoppers 422, thereby holding the rotating element 20 in the assembly. The connecting portion 24 of the rotating element 20 resists one of the connecting boards 43 so as to make the rotating element 20 fit into the frame 40. The convex portion 38 of the elastic element 30 engages in one of the rod notches 222 of the rotating element 20. The rotating element 20 may slide relative to the frame 40 so that the convex portion 38 may engage in the next rod notch 222.

Figure 7:
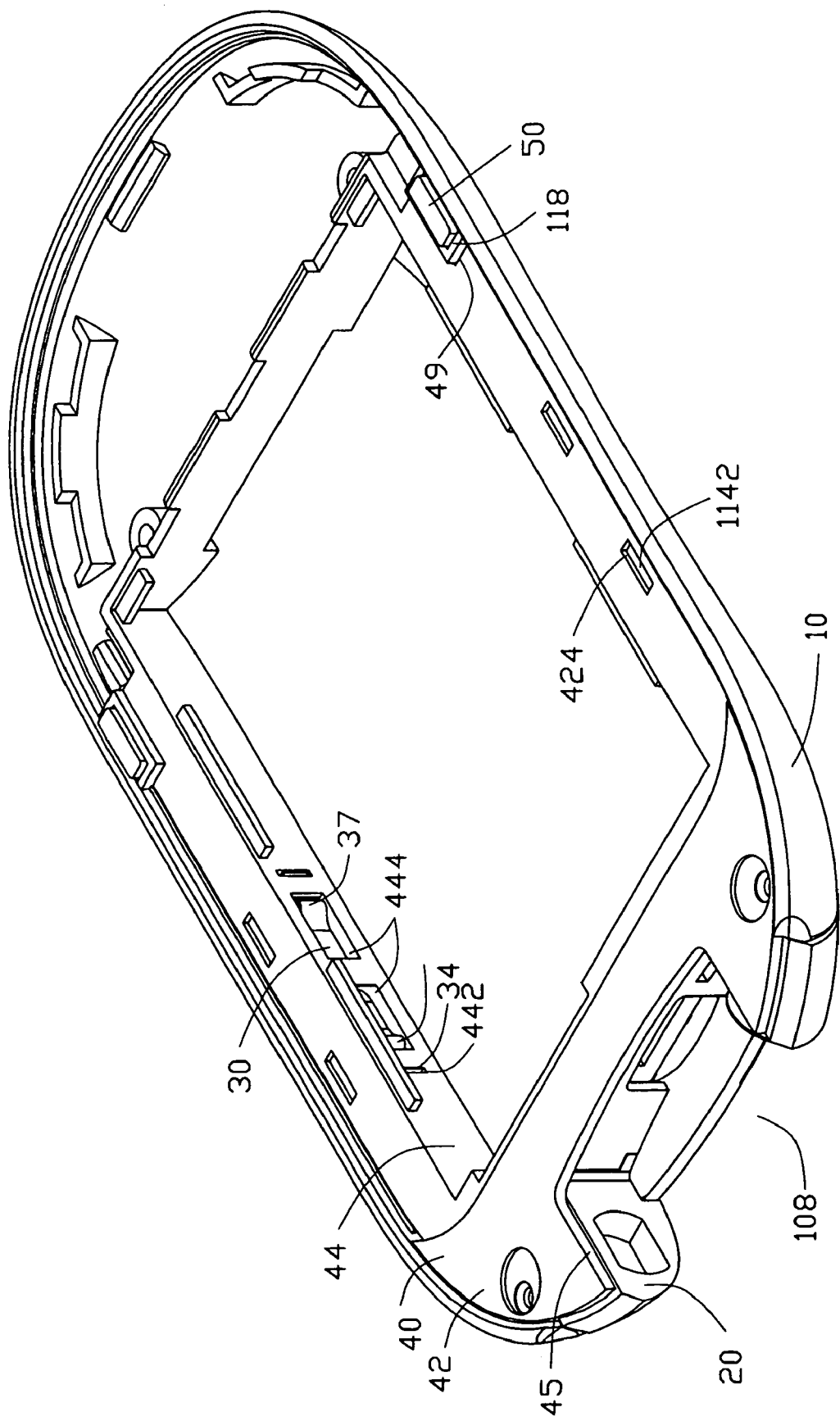
FIG. 7 is an assembled view of the cover assembly in FIG. 1.

Referring to FIG. 7, the above-assembled frame 40 is combined into the cover 10. The frame 40 is disposed at an inside of the cover 10. The rectangular opening 45 of the frame 40 is opposite to the cutout 108 of the cover 10. Simultaneously, the blocks 114 of the cover 10 are received in the latching slots 424, and the protrusions 116 of the cover 10 are received in the positioning groove 4222 of the frame 40. The step 49 of the frame 40 resists one side of the containing portion 118. Accordingly, the frame 40 is fixed on the cover 10. In order to prevent the frame 40 from falling off from the cover 10, the frame 40 is fixed with the cover 10 by means of one or more screws.

Then, the two magnetic elements 50 are received in the containing groove 119 of the cover 10, another two magnetic element 50 are received in the recess 62 of the body 60. Finally, the hinge assembly is disposed into the barrel 64 of the body 60, at the same time, two ends of the hinge assembly connect with the connecting sleeves 242 of the rotating element 20. The assembled process of the mobile phone 100 is finished.

Figure 8:
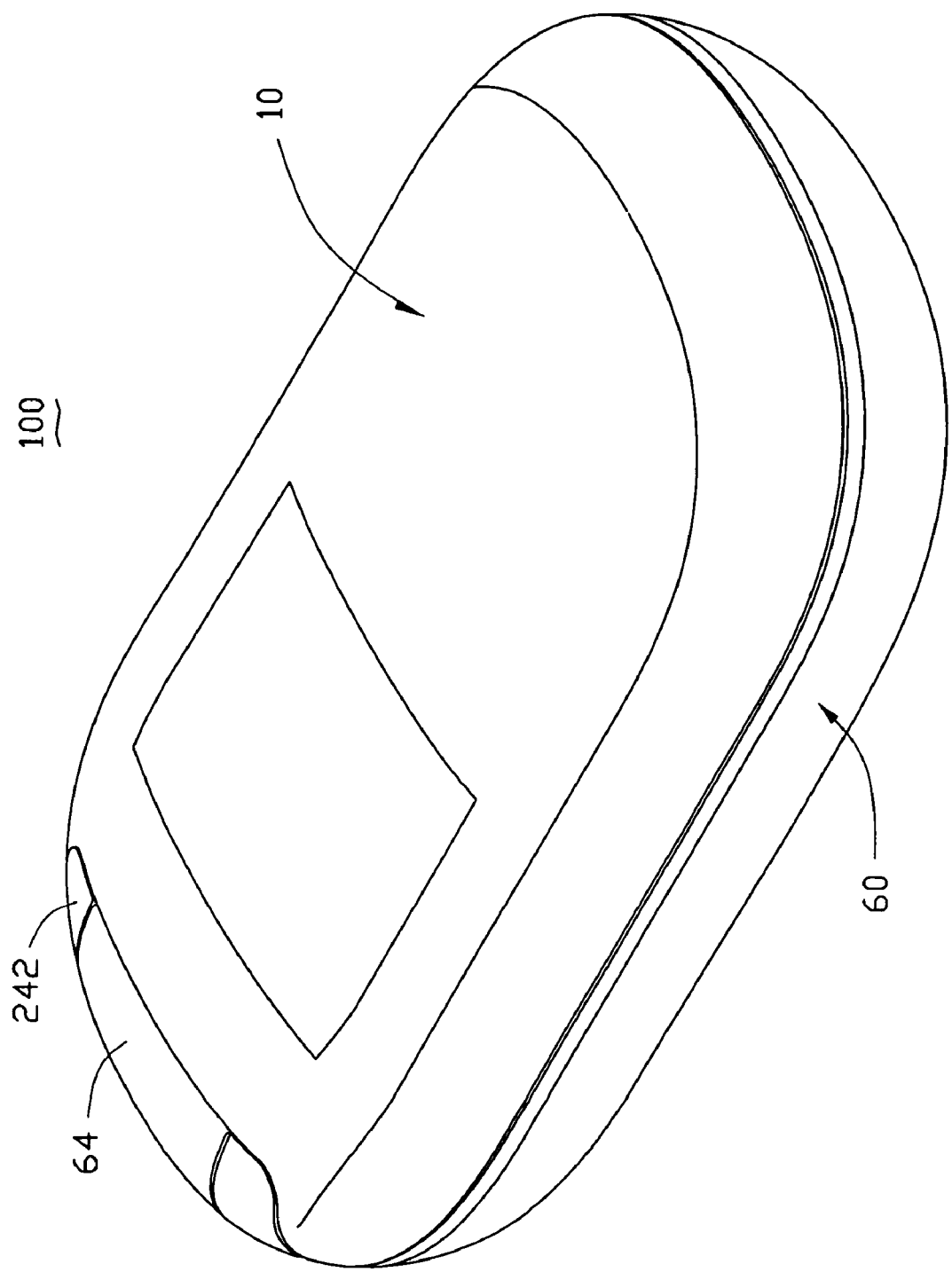
FIG. 8 is the foldable electronic device in a position corresponding to a closed state.
Figure 9:
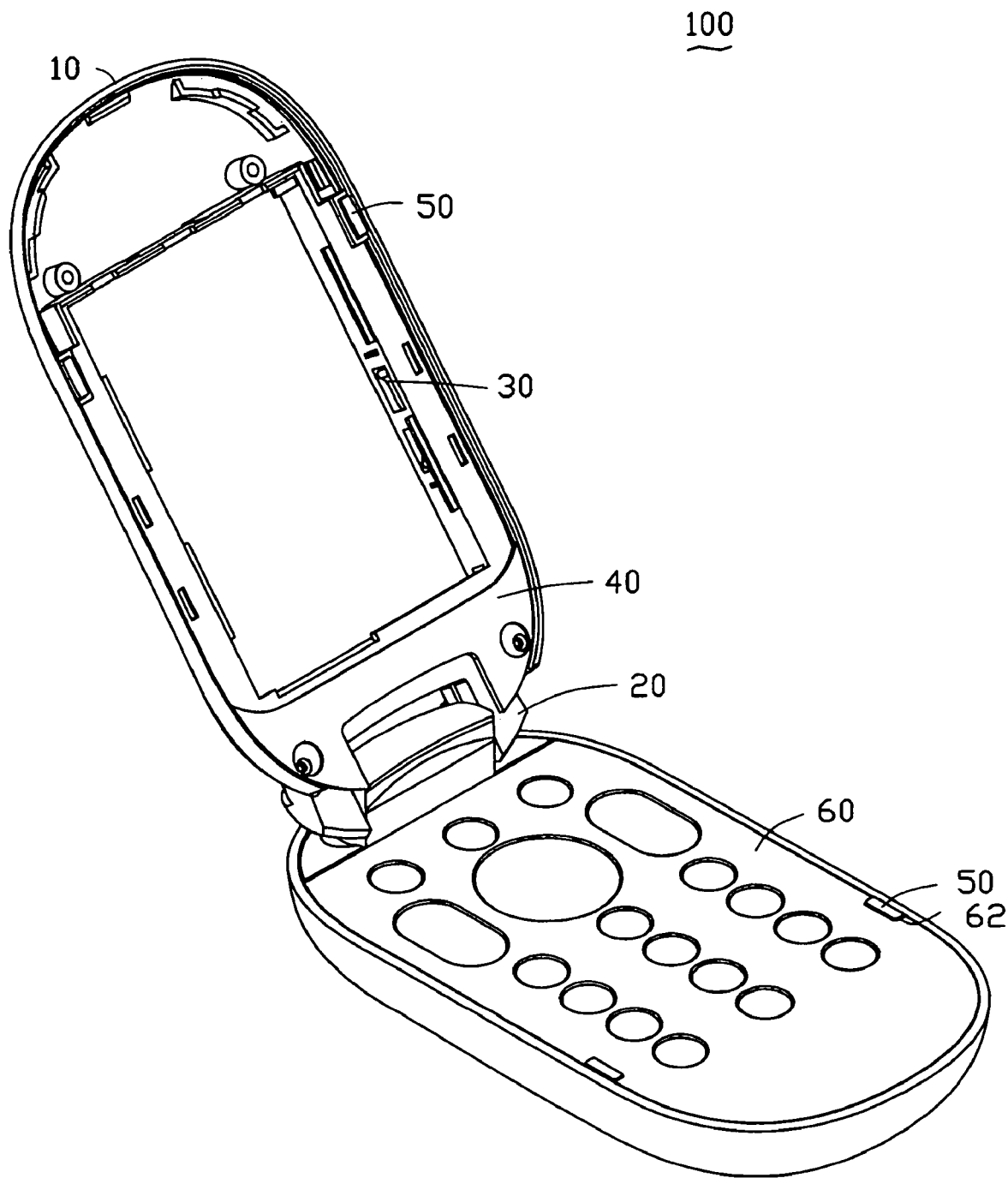
FIG. 9 is the foldable electronic device in a position corresponding to an open state.

In use, referring to FIG. 8, the hinge assembly has always a rotating tendency. However, the mobile phone 100 is kept in a closed state by means of the attraction between the two magnetic elements 50 of the cover 10 and the two magnetic elements 50 of the body 60. Referring to FIG. 9, to open the cover 10, the cover 10 is pushed toward the end wall 106. Owing to the cover 10 engaging with the frame 40, the cover 10 then moves the frame 40. The frame 40 then pushes the elastic element 30, the elastic element 30 then slides relative to the rotating element 20. The convex portion 38 of the elastic element 30 falls out from the rod notch 222 and slides into the next rod notch 222. The cover 10 is automatically opened under the hinge assembly when the magnetic elements 50 of the cover 10 are far away from the magnetic elements 50 of the body 60. When the mobile phone 100 is closed, the cover 10 is pushed by hand in a reverse direction. The convex portion 38 of the elastic element 30 then slides into the next rod notch 222 so that the magnetic elements 50 of the cover 10 are positioned opposite to the magnetic elements 50 of the body 60. Accordingly, the cover 10 is closed relative to the body 60.

In the above-mentioned embodiments, the elastic element 30 fixed with the cover 10, and the notches 222 defined in the rotating element cooperatively act as a control mechanism for limiting the frame 40 in different predetermined positions. In an alternative embodiment, the frame may be fixed with the rotating element, and notches may be defined in the frame. Furthermore, the frame may be even omitted, in which case structures slidably engaging with the rotating element may be formed directly on the cover. Moreover, the control mechanism disclosed above may be replaced with other structures that can perform such limiting function.

In the above-mentioned embodiments, the magnetic elements act as a locking mechanism for locking the cover in the closed state. Understandably, the locking mechanism disclosed above may be replaced with other structures such as mechanical latches.

As described above, the present invention provides a sliding structure for use with any portable device, beyond the mobile phone illustrated, and/or with other devices needing a sliding structure that selectably facilitates fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A sliding structure, comprising:
    a rotating element having two longitudinally extending rod portions, at least one rod portion having two longitudinally spaced notches defined therein, the rotating element configured for rotatably attaching to a main body of an electronic device;
    an elastic element having a latching portion; and
    a frame, the elastic element fixing to the frame, the frame longitudinally slidably engaging with the rod portions of the rotating element;
    wherein the latching portion of the elastic element selectably engages in one of the notches of the rotating element so as to limit the frame in different predetermined longitudinal positions relative to the rotating element.

2. The sliding structure as claimed in claim 1, wherein the rotating element further includes a connecting portion, the connecting portion connects with one end of the rod portions.

3. The sliding structure as claimed in claim 1, wherein the elastic element is substantially strip-shaped.

4. The sliding structure as claimed in claim 3, wherein the elastic element includes a main section and two extending sections, the two extending sections are perpendicularly located at two ends of the main section.

5. The sliding structure as claimed in claim 4, wherein the main section has two pivotal holes adjacent to the two extending sections.

6. The sliding structure as claimed in claim 5, wherein the main section disposes two concave portions between the two pivotal holes, and the latching portion is located between the two concave portions.

7. The sliding structure as claimed in claim 1, wherein the frame includes a main board, two connecting boards and two side boards perpendicularly connected with, the two connecting boards and the two side boards extending from an inside of the main board.

8. The sliding structure as claimed in claim 7, wherein two extending boards of the frame extend from one side of two side boards opposite to the main board, the extending board, side boards and the main board surround a receiving cavity, the receiving cavity receives the rotating element.

9. The sliding structure as claimed in claim 8, wherein the side board has two slits and two long openings defined therein, the two long openings are disposed adjacent each other, the two slits are located between the long openings, two posts are disposed at two sides of the two long openings and between the long openings and the two slits.

10. The sliding structure as claimed in claim 9, wherein the posts are located between the two slits, adjacent to two sides of the long openings, each of pivotal shafts engages in the pivotal hole of the elastic element, the extending sections of the elastic element are received in the slits, and the two concave portions of the elastic element are accommodated in the two long openings.

11. A cover assembly comprising:
    a cover, and
    a sliding structure, comprising:
    a rotating element having two longitudinally extending rod portions, the rotating element configured for rotatably attaching to a main body of an electronic device;
    a frame longitudinally slidably engaging with the rod portions and being rotatable with the rotating element, the frame being fixed with the cover so that the cover is longitudinally slidable relative to and rotatable with the rotating element; and
    a control mechanism configured for releasably locking the frame in a predetermined longitudinal position relative to the rotating element; the control mechanism comprising an elastic element fixing to the frame, the elastic element having a latching portion, at least one rod portion having two longitudinally spaced notches defined therein, the latching portion selectably engaging in one of the notches.

12. The cover assembly as claimed in claim 11, wherein the frame includes a main board, two connecting boards and two side boards perpendicularly connected therewith, and the two connecting boards and the two side boards extend from an inside of the main board.

13. The cover assembly as claimed in claim 12, wherein two opposite blocks are respectively disposed at two sides of the cover, the main board has two spaced stoppers disposed therein, the main board has two latching slots between the two stoppers, the blocks are engaged in the latching slots.

14. The cover assembly as claimed in claim 13, wherein the stopper has a positioning groove defined therein, the cover has two protrusions received in the positioning groove.

15. The cover assembly as claimed in claim 14, wherein the extending boards intersect with the main board, forming a step at one end of the main board.

16. A foldable electronic device comprising:
    a main body,
    a cover assembly rotatable between a closed state and an open state, the cover assembly comprising:
    a rotating element rotatably connecting with the main body; and
    a cover attached to the rotating element in a manner so as to be longitudinally slidable relative to and rotatable with the rotating element; and
    a locking mechanism formed between the main body and the cover assembly, the lock mechanism comprising a first magnetic element carried by the cover assembly, and a second magnetic element carried by the main body, and the first and second magnetic element attract each other so as to make the cover close relative to the main body;
    wherein the cover is longitudinally slidable between a locked position where the locking mechanism locks the cover assembly in said closed state and an unlocked position where the locking mechanism releases the cover assembly so as to allow the cover assembly to rotate to said open state.

17. The foldable electronic device as claimed in claim 16, wherein the cover assembly comprises a frame slidably attached to the rotating element and rotatable with the rotating element, the cover is fixed with the frame.

18. The foldable electronic device as claimed in claim 17, wherein the frame includes a main board, two connecting boards and two side boards perpendicularly connected with, the two connecting boards and the two side boards extend from an inside of the main board, two extending boards extend from one side of two side boards opposite to the main board, the extending board, side boards and the main board cooperatively define a receiving cavity therebetween, the receiving cavity receives the rotating element.

\* \* \* \* \*

UNITED STATES PATENT AND TRADEMARK OFFICE
CERTIFICATE OF CORRECTION

PATENT NO. : 7,643,857 B2
APPLICATION NO. : 11/396976
DATED : January 5, 2010
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Sixteenth Day of November, 2010

David J. Kappos
*Director of the United States Patent and Trademark Office*